UNITED STATES PATENT OFFICE.

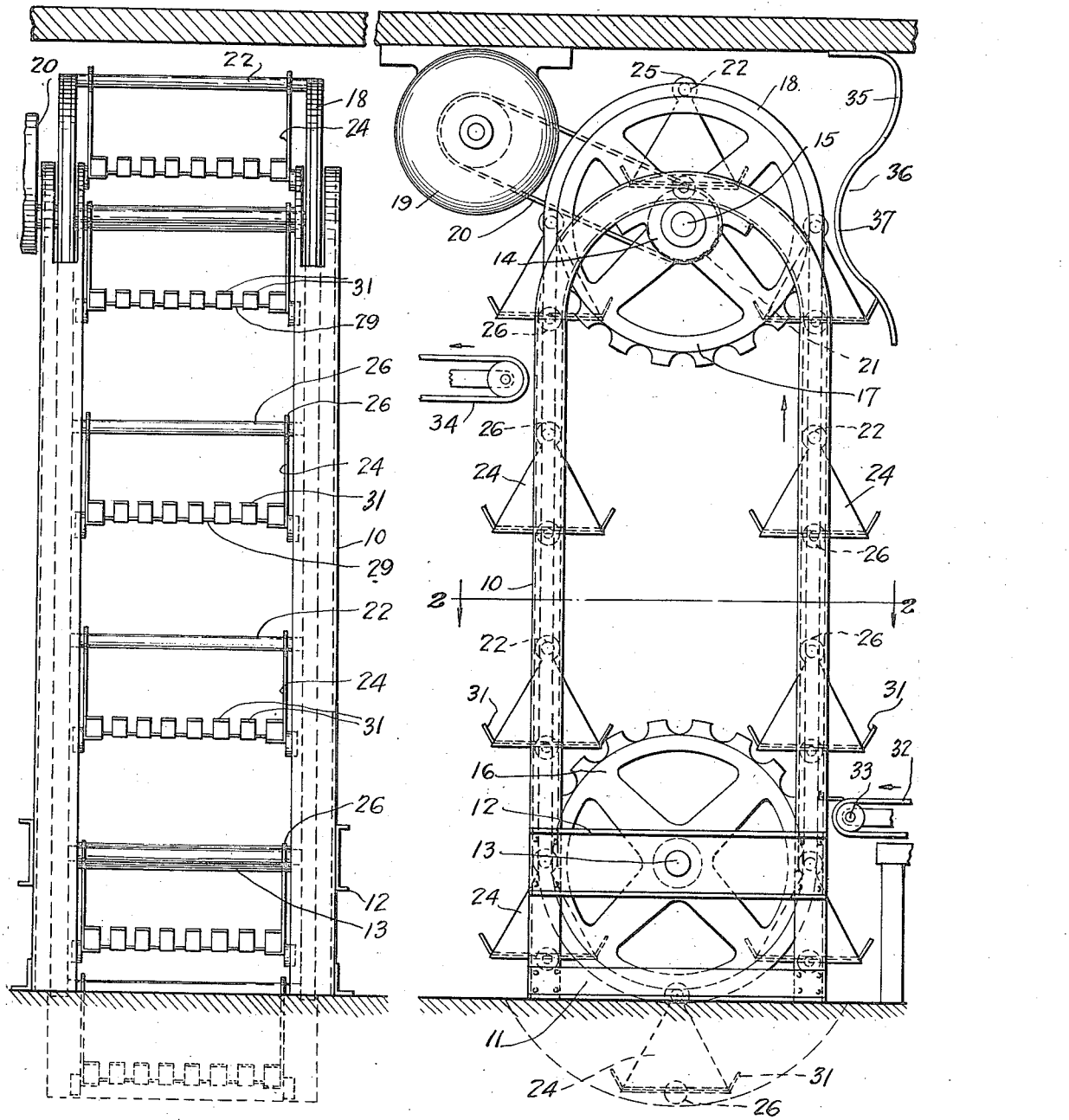

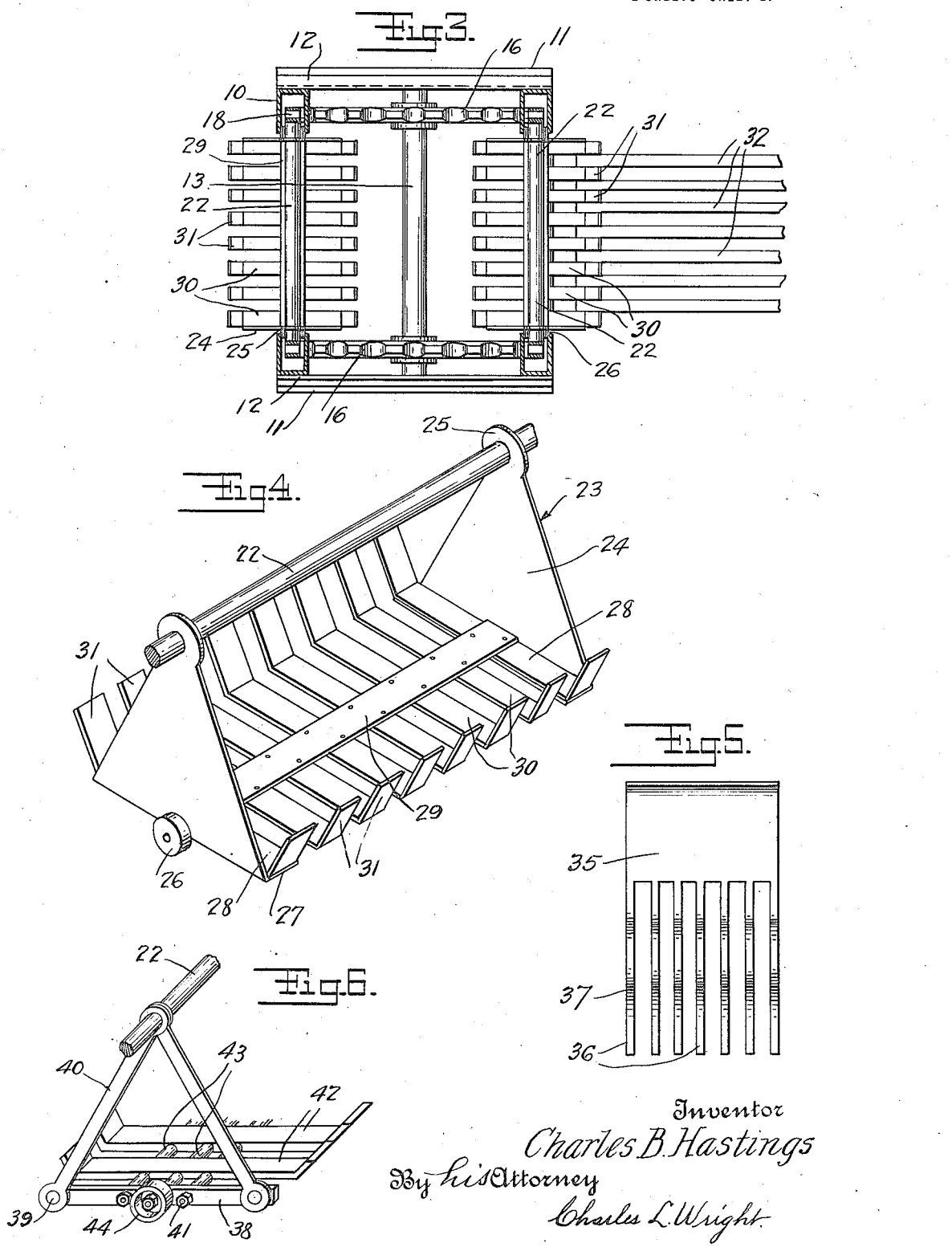

CHARLES B. HASTINGS, OF NEW YORK, N. Y.

LOADING AND UNLOADING APPARATUS.

1,423,765. Specification of Letters Patent. Patented July 25, 1922.

Application filed April 14, 1921. Serial No. 461,240.

*To all whom it may concern:*

Be it known that I, CHARLES B. HASTINGS, a citizen of the United States, residing in New York, in the county of Bronx and State of New York, have invented certain new and useful Improvements in Loading and Unloading Apparatus, of which the following is a specification.

This invention relates to improvements in loading and unloading apparatus and has for its principal object to provide a device which is particularly adapted for use in connection with bakers' ovens, printing presses and other apparatus wherein objects deposited upon traveling buckets, will be shifted from one side of each bucket to the other, preparatory to the removal of said objects by automatic means.

Another object of the invention resides in the provision of a device wherein a series of traveling buckets are arranged on the parallel operating endless chains or ropes in co-operative position with relation to endless belt conveyors which are arranged to deposit and remove objects from the conveyor buckets.

Still another object of the invention resides in the provision of a conveyor bucket built up from independent sections in such a manner that it may be adjusted in width to meet varying requirements.

With these and other objects in view the invention consists of the novel construction, combination and arrangement of parts which will be fully set forth in the following specification, claimed and illustrated in the accompanying drawings, in which:—

Figure 1 is a front view in elevation of the conveyor.

Figure 2 is a side view of Figure 1.

Figure 3 is a transverse sectional view taken on line 3—3 of Figure 2.

Figure 4 is a perspective view of one of the conveyor buckets.

Figure 5 is a face view of the shifting comb.

Figure 6 is a fragmentary perspective view of a modified form of conveyor bucket.

Referring to the drawings in detail, numeral 10 designates a pair of spaced parallel inverted U shaped guide channels, connected adjacent their lower ends with angle members 11, which are held in spaced parallel relation.

Secured to the guide channels, and connecting their legs at points slightly above the angle members 11, are channels 12, arranged intermediate their ends with bearings in which the ends of the shaft 13 are journaled.

Similar bearings 14 are arranged centrally of the bight portion of each of the channel members 11 and provide hangers for the ends of the shaft 15.

The shafts above mentioned are provided adjacent each end with sprocket wheels 16 and 17 respectively, over which the conveyor chains 18 run. A suitable driving means, such as a motor 19, is connected by a belt or similar driving element 20 to a pulley 21 attached to the shaft 15 so that when said motor is set in operation the shaft will be driven to cause the conveyor chain to travel over the sprockets.

Connecting said conveyor chains or ropes 18 in spaced parallel relation, are hanger bars 22 forming supports for the conveyor buckets, designated generically by the numeral 23. Each of these buckets comprises a pair of end members 24, preferably triangular in shape and are provided at the apices with bearing members 25 which are adapted to fit loosely over the ends of the rods 22 to pivotally support the conveyor bucket.

Secured in vertical alignment to the lower edge of each end plate 24, is a roller 26, adapted to engage in the channel guide 10 hereinbefore described. An inturned flange 27 is formed on the lower edge of each of the triangular end plates 24 and forms a support for the end strip 28 of the bottom of the conveyor bucket as shown.

A longitudinally extending connecting strip 29 is secured to the upper side of each end plate 28, and acts as a stretcher to hold the plates 24 in spaced parallel relation, as well as providing a support for the intermediate strips 30 which are riveted in spaced parallel relation to the stretcher member 29 and form the bottom of the conveyor bucket.

As illustrated in Figures 1, 2 and 4, the ends of the strips 30 are upturned, as at 31, to prevent objects placed upon the conveyor bucket from accidental dislodgement.

As illustrated in Figure 2 the device is adapted to be used in conjunction with a discharging conveyor 32, comprising a plurality of pulleys 33 arranged in spaced parallel relation, over which the string belts forming the conveyor run. It will be understood that the string belts are arranged to pass between the tines of the conveyor buckets without interference and that the conveyor 32 may be vertically adjusted to meet varying requirements.

Obviously objects received upon the conveyor buckets 23, will all rest on the side through which the ends of the conveyor 32 have passed and in order to shift said objects into position to be discharged upon the receiving conveyor 34, a shifting comb 35 is supported at a point intermediate the discharging and receiving conveyors and the tines 36 of said comb, are bent inwardly as at 37 so that objects resting upon the bottom of each conveyor bucket will be engaged by the portions 37 and shifted to the opposite side of the bucket, so that as the bucket travels upwardly the objects will be moved into position to be engaged by the comb-shaped receiving conveyor 38, which may be positioned at any suitable point along the downward run of the buckets.

In Figure 6 there is shown a modified form of bucket which consists of a pair of end bars 38 provided at opposite ends with outwardly extending studs 39, received in eyes of the supporting means 40, the opposite ends of which are provided with eyes for the reception of the rod 22. The bar 38 is provided intermediate its ends with openings for the reception of tie rods 41 which extend through similar openings in the intermediate supporting members 42, and in turn are held in spaced relation by tubular spacers 43, which may obviously vary in length in order to increase or decrease the distance between said members 42. A guide roller 44 is mounted centrally between the ends of each end bar 38 and is adapted to be received in the channels 10 previously described.

It will be obvious that by loosening the nuts on the ends of the tie rods 41, the device may be disassembled and in order that buckets of varying widths may be produced, it is only essential that the rods be removed and longer or shorter ones be substituted, thus providing an adjustable bucket.

While in the foregoing there has been shown and described the preferred embodiment of this invention, it is to be understood that certain minor changes in the details of construction, combination and arrangement of parts may be resorted to without departing from the spirit and scope of the invention as claimed.

I claim:

1. A conveyor comprising a plurality of vertically movable buckets, a plurality of spaced bars having upturned end forming the bottoms of said buckets, means for moving said buckets, and comb-shaped means arranged in the path of said buckets to enter between said bars and shift the contents thereof from one side of the buckets to the other during their upward travel.

2. A conveyor comprising a plurality of vertically movable buckets having transversely barred bottoms, endless means for supporting and moving said buckets, discharging and receiving platforms associated with the buckets for disposing objects upon and removing said objects from the buckets, and a shifting comb disposed intermediate the upper and lower ends of the upper run of the endless means for shifting the objects from the discharging to the receiving side of said buckets.

3. In a conveyor, a pendant bucket comprising a pair of triangular end plates having their apices disposed upwardly a support rod journalled therein, a plurality of slats forming the bottom of the buckets, said slats being upturned at each end and supported from a point intermediate their upturned ends whereby free passage between said slats may be had and translating means intercepting the spaces of said slots.

In testimony whereof I have signed my name to this application.

CHARLES B. HASTINGS.